(12) United States Patent
Schuh et al.

(10) Patent No.: US 11,845,149 B2
(45) Date of Patent: Dec. 19, 2023

(54) POWER SUPPLY AND METHOD FOR DUAL PROCESS WELDING

(71) Applicant: Illinois Tool Works Inc., Glenview, IL (US)

(72) Inventors: Richard J. Schuh, Freedom, WI (US); Robert R. Davidson, New London, WI (US)

(73) Assignee: Lyco Manufacturing, Inc., Columbus, WI (US)

( * ) Notice: Subject to any disclaimer, the term of this patent is extended or adjusted under 35 U.S.C. 154(b) by 960 days.

(21) Appl. No.: 15/400,238

(22) Filed: Jan. 6, 2017

(65) Prior Publication Data

US 2018/0193938 A1 Jul. 12, 2018

(51) Int. Cl.
  *B23K 9/09* (2006.01)
  *B23K 9/095* (2006.01)
  *B23K 9/10* (2006.01)

(52) U.S. Cl.
  CPC ............. *B23K 9/091* (2013.01); *B23K 9/09* (2013.01); *B23K 9/0956* (2013.01); *B23K 9/1062* (2013.01)

(58) Field of Classification Search
  CPC .. B23K 9/1006; B23K 9/1062; B23K 9/1043; B23K 9/0956; B23K 9/09; B23K 9/091; B23K 9/095; B23K 9/0953; B23K 9/092; B23K 9/10; B23K 9/1056; B23K 9/32; B23K 9/093; B23K 9/173; B23K 13/08; B23K 31/125; B23K 9/0008; B23K 9/0282; B23K 9/067; B23K 9/073; B23K 9/1018; B23K 9/1068; B23K 9/327

USPC ..... 219/130.1, 130.21, 130.5, 130.51, 125.1, 219/133, 136, 137 R, 137.71, 74, 117.1, 219/130.31, 130.33, 130.4, 132, 137.7, 219/78.01

See application file for complete search history.

(56) References Cited

U.S. PATENT DOCUMENTS

| | | | |
|---|---|---|---|
| 6,329,636 B1 | 12/2001 | Geissler | |
| 6,717,107 B1 * | 4/2004 | Hsu | B23K 9/092 219/130.51 |
| 6,872,914 B2 * | 3/2005 | Hsu | B23K 9/1056 219/130.51 |
| 6,909,067 B2 | 6/2005 | Davidson et al. | |
| 7,067,767 B2 * | 6/2006 | Hsu | B23K 9/092 219/130.21 |
| 2004/0069759 A1 * | 4/2004 | Davidson | B23K 9/091 219/130.5 |
| 2004/0222203 A1 * | 11/2004 | Holverson | B23K 9/0282 219/130.5 |
| 2007/0235434 A1 | 10/2007 | Davidson et al. | |

(Continued)

FOREIGN PATENT DOCUMENTS

| | | |
|---|---|---|
| CN | 1638907 A | 7/2005 |
| CN | 1836818 A | 9/2006 |

(Continued)

OTHER PUBLICATIONS

Office Action, dated Jul. 20, 2020, CIPO, 50 Victoria Street, Place du Portage 1, Gatineau, Quebec K1A 0C9 Canada.

(Continued)

*Primary Examiner* — Chris Q Liu
(74) *Attorney, Agent, or Firm* — George R. Corrigan

(57) ABSTRACT

A method and apparatus for providing welding-type power that alternates between at least a hotter and a colder process is disclosed.

2 Claims, 6 Drawing Sheets

(56) References Cited

U.S. PATENT DOCUMENTS

2016/0067810 A1* 3/2016 Radtke ................ B23K 9/1006
                                                  219/133
2016/0067814 A1* 3/2016 Furusako .............. B23K 11/115
                                                  219/86.31

FOREIGN PATENT DOCUMENTS

| CN | 101111120 A | 1/2008 |
| CN | 102712058 A | 10/2012 |
| CN | 102791414 A | 11/2012 |
| CN | 103100785 A | 5/2013 |
| CN | 104023893 A | 9/2014 |
| CN | 105050761 A | 11/2015 |
| FR | 2705443 A1 | 11/1994 |
| JP | 2005219106 A | 8/2005 |
| WO | 03076114 | 9/2003 |

OTHER PUBLICATIONS

Office Action, dated Nov. 4, 2020, CNIPA, 6 Xitucheng Lu, Jimenqiao, Haidian District, Beijing 100088 CHINA.

* cited by examiner

POWER SUPPLY AND METHOD FOR DUAL PROCESS WELDING

FIELD OF THE INVENTION

The present invention relates generally to the art of welding and welding type power supplies. More specifically, it relates to profile pulse welding and pulse welding power supplies that provide a profile pulse output.

BACKGROUND OF THE INVENTION

There are many known types of welding type systems used for many different welding processes. Welding type system, or system for providing welding type power, as used herein, includes one or more of a power source, controller, wire feeder, and a source of gas, it may also include peripherals such as robots etc., that cooperate to provide welding type power. Welding type power supply, as used herein, includes any device capable of supplying welding, plasma cutting, induction heating, CAC-A and/or hot wire welding/preheating (including laser welding and laser cladding) power including power circuitry, control circuitry and other ancillary circuitry associated therewith. Welding type output power, as used herein, is power suitable for welding, plasma cutting, induction heating, CAC-A and/or hot wire welding/preheating (including laser welding and laser cladding).

One known welding process is a pulsed MIG process. A pulsed MIG process typically has a cyclical output having at least a peak portion with a relatively high current and a background portion with a relatively low current. A typical prior art pulsed MIG welding cycle is shown in FIG. 1, and includes a flat peak 101 (which is rounded in some prior art), a background 102, and steep transitions 103 and 104 between them. There is often an abrupt change in slope from the beginning and end of the peak and background portions. Some pulse processes include knees where the output current is maintained at a level between the peak and background. Pulse welding, as used herein, includes welding with output power that is generally pulsed, at a controllable frequency, between a greater peak and a lesser background, and pulse welding is performed in an arc state. Pulse process, as used herein, is a welding process with the output in an arc state and with output power that is generally pulsed, at a controllable frequency, between at least a greater peak and a lesser background, and can have one or more knee phases or other phases.

Occasional, inadvertent shorts may occur, but the process is generally in an arc state. Welding cycle (or pulse cycle), as used herein, is comprised of at least a peak, followed by a transition down, followed by a background, followed by a transition up. Welding cycles are typically on the order of milliseconds or tens of milliseconds. Welding cycles can include other portions as well, and a controller can use a state based control scheme where, under certain circumstance, the typical order (peak, down, background, up) is not followed.

Another known welding process is a spray process where a relatively constant output is provided and metal is transferred by the wire melting and "spraying" to the work piece, typically as a very fine mist. Spray process, as used herein is a welding process where the wire sprays or has very fine mist transferring to the workpiece, and is usually performed at a higher voltage.

Another welding process is short circuit MIG (or short-arc) welding. Short circuit MIG welding typically transfers in a short condition (short circuit welding). The molten ball is transferred at any time during the process, and is transferred when the molten ball touches the weld puddle. Short circuit process, as used herein, is a welding process with the output alternating between an arc state and a short circuit state. Short circuit MIG welding typically has a single voltage target, not a defined waveform, with a control loop to maintain an average voltage. This is different from pulse welding which typically begins (and sometimes finishes the molten ball transfer) while in an arc condition. The molten ball is typically transferred during or shortly after the peak (the time of transfer is controlled by the waveform). This is also different from spray Mig which uses high currents and voltages to maintain an arc and allow the ball to transfer across the arc (typically without the wire touching the weld puddle).

Welding processes can be described as hotter processes or colder processes. Hotter processes deliver more energy to the arc, and have a puddle that is relatively fluid. Hotter processes are desirable for welds that require melting more metal and colder process are desirable for welds that require melting less metal, such as thinner workpieces. Processes that tend to be hotter processes include, Spray MIG, pulse (Accupulse®, Accucurve®). Processes that tend to be colder processes include Short circuit Mig, Rmd® and Rmd Pulse (Versapulse®). Some processes tend to be hotter or colder, depending on the output parameters used. Hotter process, as used herein, is a welding process that runs hotter than a welding process to which it is being compared.

Colder processes deliver less energy to the arc but have a puddle that is less fluid and melt less metal. Because they melt less metal they are well suited for welding thin workpieces. Examples of colder processes include RMD®, versa pulse/RMDP®, CMT welding, and in some instances, Accupulse® and Accucurve®. Colder process, as used herein, is a welding process that runs cooler than a welding process to which it is being compared.

One type of pulse welding is profile pulse welding. Profile pulse welding has an output that is switched between two different sets of welding parameters (such as wire speed and voltage or arc adjust), within one welding operation (i.e., without terminating the output current). One set of parameters is chosen for more energy to the weld and less energy to the weld. Thus, the output alternates between a warmer and less warm welding state. The warmer state heats the weld puddle and the puddle flows into the part. The less warm state allows the weld puddle to cool and solidify. Alternating between these two states provides a weld with a rippled appearance (often called a layer dime look, which looks like a stack of dimes was layered horizontal with some overlap). Changing the balance of time between the warmer and less warm states allows the puddle heat to be controlled. Changing the frequency of oscillation allows the number of ripples in the appearance to be controlled. However, profile pulse welding can be difficult to use with thinner workpieces, because it is a pulse process and usually a hotter process.

Accordingly, a welding output that provides the layer dime looks, and provides thin material welding such as in a colder process, yet provides more melting such as in a hotter process, is desirable.

SUMMARY OF THE PRESENT INVENTION

According to a first aspect of the disclosure a welding-type power supply includes a power circuit and a controller. The power circuit receives input power and provides welding type output power, and includes at least one switch with a control input to the switch. The controller has a control output connected to the switch control input, and the controller includes a hotter process module and a colder process module. An alternating process module in the controller is connected to the hotter process module and the colder process module.

According to a second aspect of the disclosure a method of providing welding-type power includes providing colder process welding power, ending the providing of the colder welding process power, providing a hotter process welding power, and ending the providing of the hotter welding process power. The process is repeated, alternating between hotter and colder processes.

The system includes a feedback circuit connected to the welding type output and the alternating process module is responsive to the feedback circuit, in one alternative.

The feedback circuit provides a signal responsive to one of heat input to the weld and penetration of the weld in another alternative.

The hotter process module is one of a pulse process and a spray process and the colder process module is a short circuit process in various embodiments.

The alternating process module includes one or two timers, and the alternating process module alternates process when the timers expire in one alternative.

The alternating process module includes a waveform cycle counter, and alternates processes module after a desired number of cycle waveforms are counted in another alternative.

A process change input that receives a signal from outside of the welding type system causes the alternating process module to alternate processes in one embodiment.

The controller includes at least a third process module connected to the control output, and the alternating process module is connected to the third process module in various embodiments.

Other principal features and advantages of will become apparent to those skilled in the art upon review of the following drawings, the detailed description and the appended claims.

Figure 1:
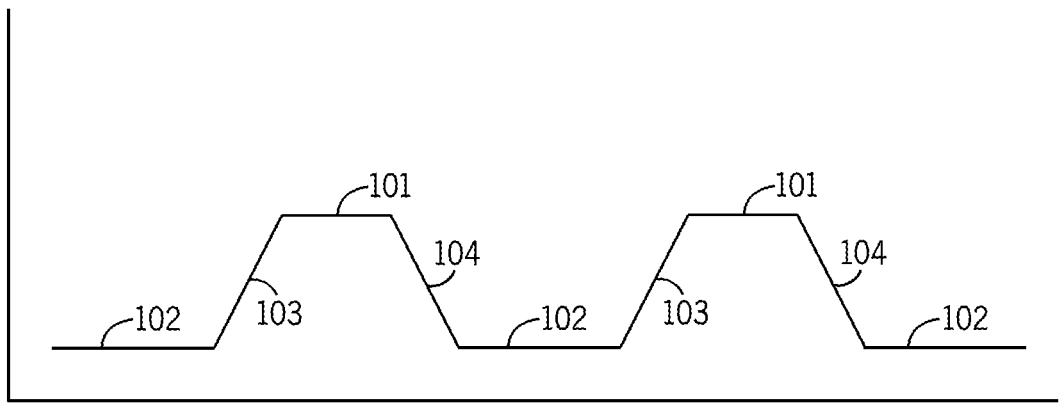
FIG. 1 is a prior art MIG pulses welding cycle.

Before explaining at least one embodiment in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular system for providing welding type power, with particular components, and used for particular processes, it should be understood at the outset that the invention may also be implemented with other welding type systems, processes, components, controllers, etc.

Generally, the disclosure provides for dual process output that alternates between a hotter process and a colder process within one welding operation (i.e., without terminating the output current), preferably using the same weld wire and gas. While the prior art pulse profile simply altered the output parameters of a pulse process to try and make it intermittently less warm, the disclosure provides that the output actually changes from a hotter process to a colder process. Various alternatives provide that the hotter process is one or more of MIG, pulse and/or spray or spray arc processes, and that the colder process is one or more of short-arc, STT®, RMD®, and/or CMT welding.

The system includes a power circuit and a controller to control the power circuit. Controller, as used herein, includes digital and analog circuitry, discrete or integrated circuitry, DSPs, microprocessors, etc., and maybe located on one or more boards. Power circuit, as used herein, includes circuitry capable of supplying welding type power including converters, resonant power supplies, quasi-resonant power supplies, etc., and ancillary circuitry associated therewith.

The power circuit receives input power and includes one or more switches that are controlled by the controller such that the power circuit provides welding type output power. The controller includes a number of functional modules that cause the output to be as desired. Other than as described below with respect to the dual process outputs, the controller can be a prior art controller. The controller preferably includes a microprocessor or DSP that performs some of the control functions. Module, as used herein, includes software and/or hardware, digital or analog, that cooperate to perform one or more control tasks, and can include digital commands, power circuitry, networking hardware, etc.

The controller in the present design includes a hotter process module, a colder process module, and an alternating process module that causes the output to alternate between a colder process and a hotter process. Hotter process module, as used herein, is a module that controls a power circuit such that the power circuit provides welding type power for performing a hotter process relative to other process that are provided by the power circuit. Colder process module, as used herein is a module that controls a power circuit such that the power circuit provides welding type power for performing a colder process relative to other process that are provided by the power circuit. Alternating process module, as used herein is a module that causes a welding type output to alternate between two or more processes, such as between a hotter process and a colder process.

The controller preferably receives feedback of the output from a feedback circuit, and the alternating process module causes the output to switch from the colder or hotter process to the other process in response to the feedback. For example, various embodiments provides that the feedback signal is indicative of the heat input to the weld and/or the penetration of the weld and/or the balance of the hotter/colder processes. The output is alternated to obtain a desired average heat or balance. Alternatively each process can have its own heat target, and the balance can be adjusted to spend more time in one process or the other. A fixed time can be provided for each process and timers can be used to determine when to alternate between processes. Another alternative provides for staying in one process for a given number of weld cycles (peak-background or short-arc cycles, e.g.).

Various alternatives provide that the hotter process is a pulse process or a spray process, and that the colder process is a short circuit process. A signal from outside of the welding type system can be provided to the alternating process module, to cause the alternating process module to the change the process. Additional processes can also be provided. For example, the output could alternate between three or more processes, or occasionally use a third process.

Figure 2:
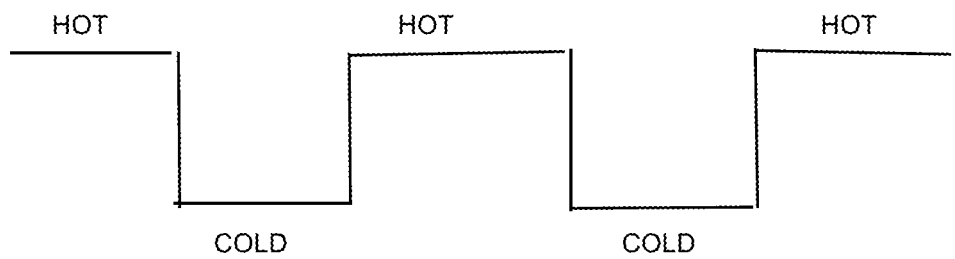
FIG. 2 is a graph of a process in accordance with the disclosure.

FIG. 2 shows a graph of the output alternating between hotter and colder processes. As described above, the alternations can be time based, feedback based, or set from outside the system.

Figure 3:
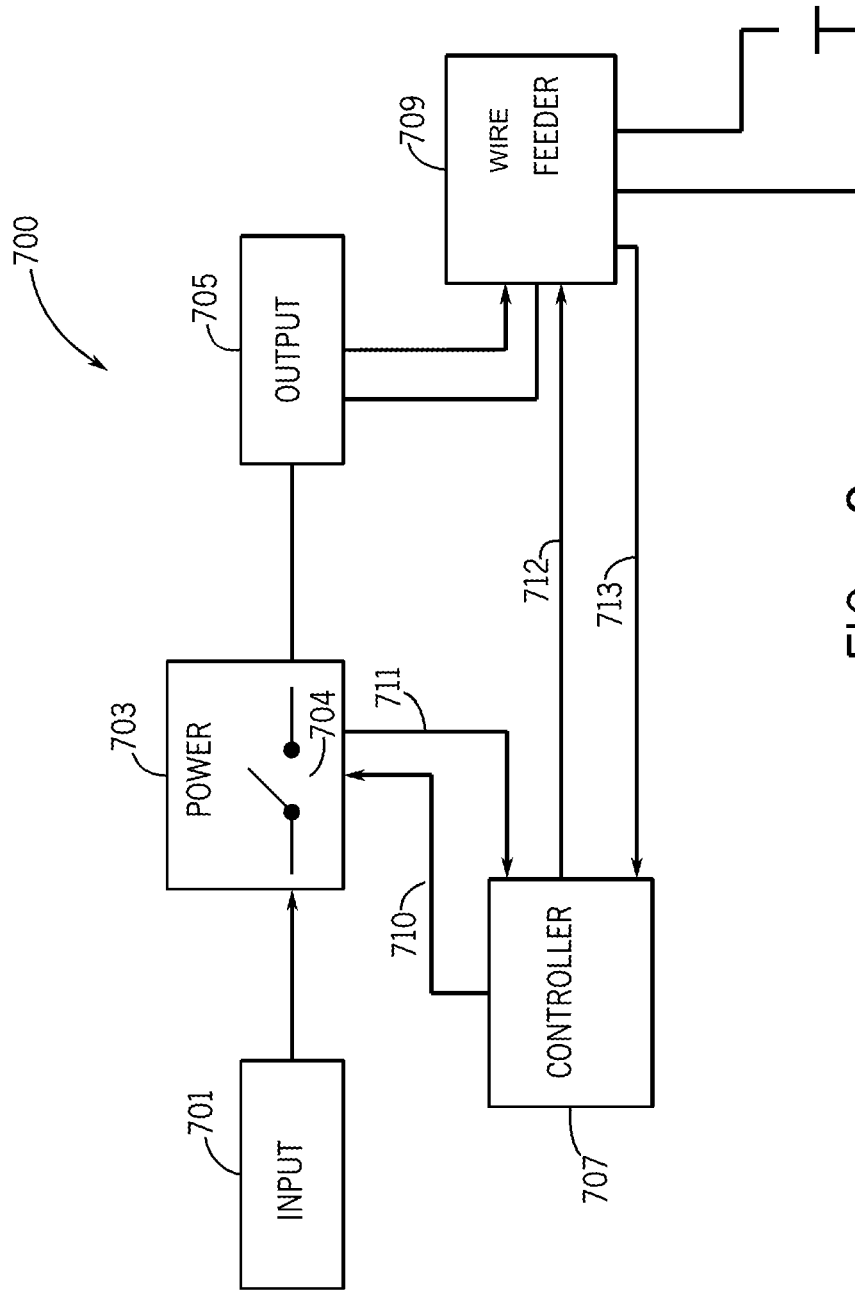
FIG. 3 is a block diagram of graph of a welding type system.

Referring now to FIG. 3, a system 700 for providing welding type power 700 in accordance with the present disclosure includes a power source comprised of an input circuit 701, a power circuit 703 and an output circuit 705, a wire feeder 709, that are controlled by a controller 707 to produce a welding output. The various components may be disposed in separate or common housings, and may be in more than one housing (a portion of controller 707 can share a housing with power circuit 703, while another portion shares a housing with wire feeder 709). Power circuit, as used herein, includes circuitry capable of supplying welding type power including converters, resonant power supplies, quasi-resonant power supplies, etc., and ancillary circuitry associated therewith.

One preferred embodiments provide that the power source is a Miller networked power source such as that described in U.S. Pat. No. 6,329,636 or U.S. Pat. No. 6,909,067, both of which are hereby incorporated by reference, and wire feeder 709 is a Miller networked wire feeder. Other wire feeders and power supplies maybe used to implement the invention. Controller 707 is part of the commercially available components in the preferred embodiments, with the additional features set forth herein Alternative embodiments provide that system 700 be another power supply, such as a CMT, RMD®, Accupulse®, IQ Pulse®, or AC MIG power supply and provide the corresponding output, or other welding output. CMT output, as used herein, is an output that may be used for CMT welding. AC MIG output, as used herein, is an output that may be used for AC MIG welding. CMT power source, as used herein, includes a power source that provides a CMT output. AC MIG power source, as used herein, is a power source that provides an AC MIG output.

Input circuit 701 receives input power that can be 115 VAC single phase or 230/460 VAC three phase, or other utility or engine/generator power inputs. Preferably the input power is rectified and conditioned to be the intermediate power. Input circuit, as used herein, refers to circuits configured to receive an input signal and to provide an intermediate power signal, and may include things such as a rectifier, a transformer, a saturable reactor, a converter, an inverter, a filter, and/or a magnetic amplifier.

Power circuit 703 is preferably a high frequency DC to DC converter, such as a buck, boost, half bridge etc. A switch 704 is used to represent the switches in the converter, and may be comprised of one or more switches such as FETs. Other topologies may be used. Power circuit 703 preferably includes a power transformer to isolate the intermediate input from the welding output. Power circuit, as used herein, includes circuitry capable of supplying welding type power including converters, resonant power supplies, quasi-resonant power supplies, etc.

Power circuit 703 has a power control input 710 which provides the current command signal as an input to the converter. Then converter uses switch 704 to create the high power welding output. The output power is responsive to the power control input 710. Control input, as used herein, is an input to a circuit, such as a power circuit, that controls the output of the circuit.

Power circuit 703 preferably receives high voltage low current intermediate power, and provides low voltage high current pulse welding output power to output circuit 705. Output circuit, as used herein, refers to circuits configured to receive power and to provide output power, and may include filters, converters, transformers, etc.

Power is delivered to wire feeder 709 by output circuit 705. Alternatively, output circuit 705 may be part of wire feeder 709. Wire feeder 709 feeds a spool of wire to the welding arc at a constant or controlled rate. The wire is burned off with the output current as controlled by the controller 707. The wire feed speed is set by the controller and sent to the wire feeder on line 712. A feedback circuit 713 (or 711) provides a feedback signal responsive to the output voltage and responsive to the output current to controller 707. As will be described in detail below, in one embodiment controller 707 uses the feedback of parameters such as heat input, penetration, number of cycles, and/or balance to control the welding pulse cycle. Feedback circuit, as used herein, is a circuit that cooperate to provide a feedback signal to a controller. Feedback signal, as used herein, includes one or more signals that provide information about one or more parameters being monitored, such as output current and output voltage.

Figure 4:
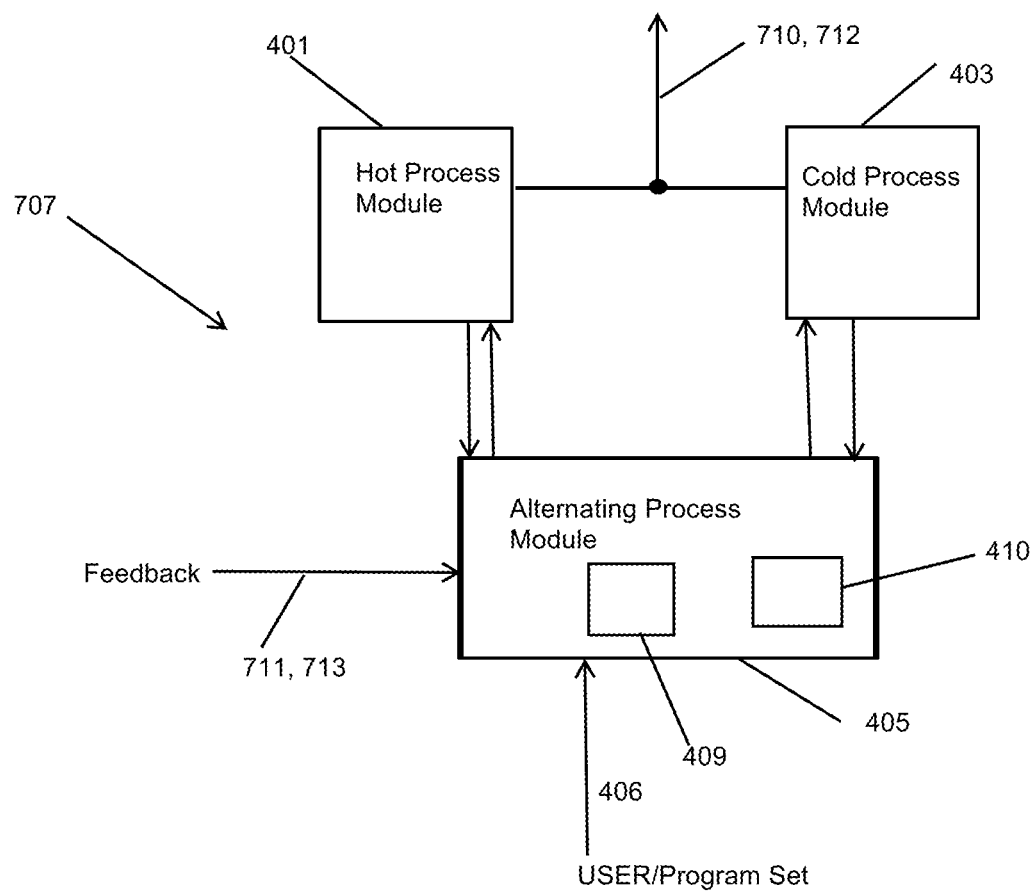
FIG. 4 is a block diagram of controller.

Controller 707 is shown in FIG. 4, and includes a hotter process module 401, a colder process module 403 and an alternating process module 405, in addition to the modules found in prior art controllers. Hotter process module 401 is activated by alternating process module 405 when a hotter process is desired. Colder process module 403 is activated by alternating process module 405 when a colder process is desired. The hotter and colder process modules can each provide a number of processes, or be dedicated to particular processes.

In one embodiment hotter process module 401 provides Spray MIG, and colder process module 403 provides short circuit MIG, Accupulse®, RMD®, and RMDP®. Spray Mig at 300 IPM wirefeed speed and 23 volts has a different heat input than an Accupulse® program at 250 IPM wirefeed speed and 50 arc adjust. Thus, allowing different process parameters gives a wider area of heat inputs (hotter and colder cycles). It also allows the colder process that generates less spatter (undesired molten metal that clings to the welded part not in the puddle), for example RMD or RMDP process. If additional processes are used, then additional modules can be provided. Control signals to power circuit 703 and wire feeder 709 are provided on lines 710 and 712 from controller 707.

One embodiment provides that hotter process module 401 implement a spray MIG process in accordance with the following chart, and that colder process module 403 implement one of Accupulse®, short circuit MIG, RMD® and RMDP® in accordance with the following chart. Other embodiments provide for the user to set the parameters from any available parameters.

| WELD PROCESS | COMMANDS | | MEASURED VALUES | | |
| --- | --- | --- | --- | --- | --- |
| | V or Arc adjust | WFS | V | I | Power |
| Spray MIG | 23 | 300 | 23 | 222 | 5772 |
| Accupulse ® | 50 | 250 | 23.2 | 155 | 3596 |

| WELD | COMMANDS | | MEASURED VALUES | | |
|---|---|---|---|---|---|
| PROCESS | V or Arc adjust | WFS | V | I | Power |
| Short Circuit MIG | 171 | 250 | 17.1 | 180 | 3078 |
| RMD ® | 50 | 250 | 17.5 | 190 | 3325 |
| RMDP ® | 50 | 250 | 20.5 | 140 | 2870 |

As described above, the alternations can be based on time, and timers (or timing modules) 409 and 410 are provided for this embodiment. A user/program input provided on line 406 sets the length of time for each timer to be active, and thus amount of time in each process type.

Other embodiments provide for feedback on lines 711 and 713 to be used to determine when alternating process module 405 causes the output to change from one process to the other. The feedback signal on lines 711 and 713 is indicative of the heat input to the weld and/or the penetration of the weld and/or the balance of the hotter/colder processes in various processes, and the output is alternated to obtain a desired average heat or balance. Alternatively each process can have its own heat target, and the balance can be adjusted to spend more time in one process or the other. Another alternative provides for staying in one process for a given number of weld cycles (peak-background or short-arc cycles, e.g.).

Figure 5:
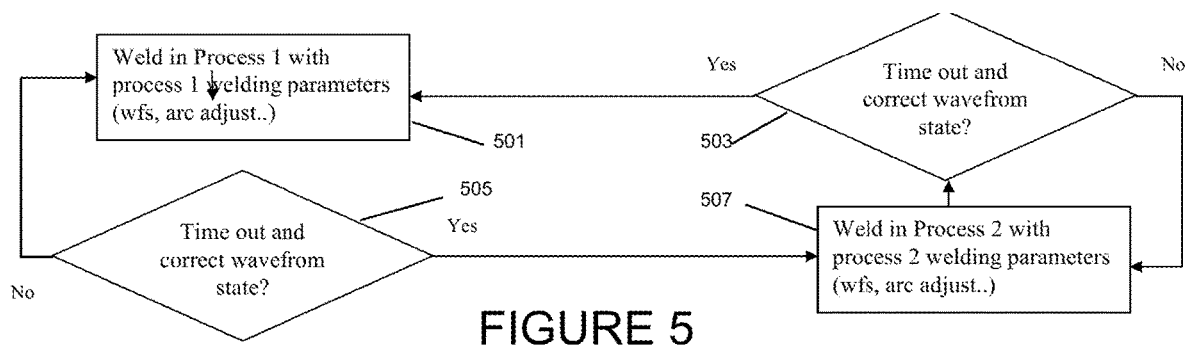
FIG. 5 is a flow chart implementing a part of the controller.

A flow chart implementing a controller using timers to change states is shown in FIG. 5. Step 501 provides for welding in process 1 (hotter process for example) and step 507 provides for welding in process 2 (colder process for example). Decision 503 determines if the timer has expired and if it is the correct waveform state (i.e., the part of the waveform where the transition from process 2 to process 1 should occur). One embodiment provides that the correct waveform state is just after or a short cleared or a peak current detached the ball. Another embodiment provides that any state is defined by the process can be the correct state.

If both the time has expired and the process is in the correct waveform state then alternating module 405 changes activates hotter process module 401 and deactivates colder process module 403. If one of the conditions (timer expired and being in the correct waveform state) is not met, then the process continues in the colder process until both conditions are met. Decision 505 determines if the timer has expired and if it is the correct waveform state (i.e., the part of the waveform where the transition from process 1 to process 2 should occur). If both the time has expired and the process is in the correct waveform state then alternating module 405 changes activates colder process module 403 and deactivates hotter process module 401. If one of the conditions (timer expired and being in the correct waveform state) is not met, then the process continues in the hotter process until both conditions are met. Typically the frequency of the hotter/colder cycle is around 0.5 hertz to 10 hertz. The balance (time in hotter vs time in colder) can be adjusted to affect the heat input and weld bead appearance (how defined the layered dime look appears).

Figure 6:
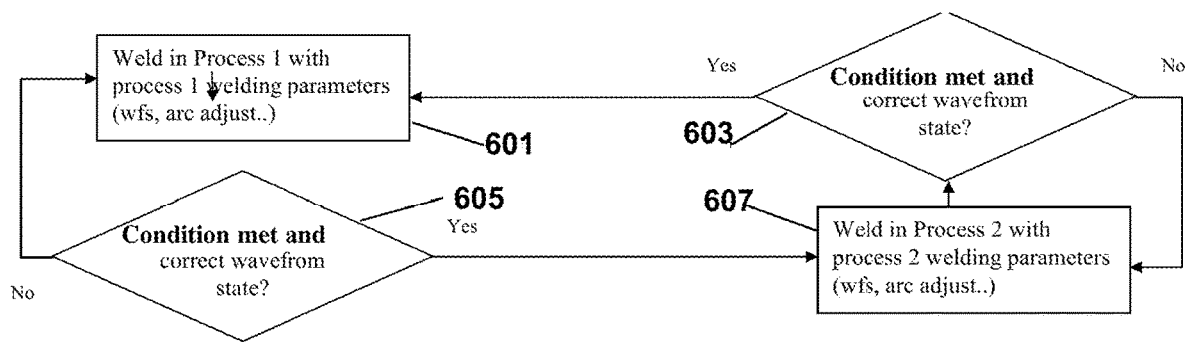
FIG. 6 is a flow chart implementing a part of the controller.

A flow chart implementing a controller using feedback to change states is shown in FIG. 6. Step 601 provides for welding in process 1 (hotter process for example) and step 607 provides for welding in process 2 (colder process for example). Decision 603 determines if the feedback condition has been met (such as the amount of heat or penetration desired has been provided, or the number of cycles provided) and if it is the correct waveform state. If both the feedback condition is met and the process is in the correct waveform state, then alternating module 405 changes activates hotter process module 401 and deactivates colder process module 403. If one of the conditions is not met, then the process continues in the colder process until both conditions are met. Decision 605 determines if the feedback condition has been met and if it is the correct waveform state. If both the time has expired and the process is in the correct waveform state, then alternating module 405 changes activates colder process module 403 and deactivates hotter process module 401. If one of the conditions is not met, then the process continues in the hotter process until both conditions are met.

One embodiment provides when counting cycles to alternate there are five short circuit Mig cycles followed by four Accupulse® peaks, and then repeat. Another embodiment provides that the process change can be controlled by high speed communication, for example to a robot. Another embodiment provides that the process be extinguished and re-ignited. at some or all alternations. When more than two processes are be used, one embodiment provides for a very hotter process followed by a medium heat process, followed by a very colder process, followed by a medium process, and then repeat. The timed program change can be initiated outside the welder in a PLC, robot, computer, or other hardware. This is not a single program change but a repetitive timed event.

Numerous modifications may be made to the present disclosure which still fall within the intended scope hereof. Thus, it should be apparent that there has been provided a method and apparatus for a welding type system that fully satisfies the objectives and advantages set forth above. Although the disclosure has been described specific embodiments thereof, it is evident that many alternatives, modifications and variations will be apparent to those skilled in the art. Accordingly, the invention is intended to embrace all such alternatives, modifications and variations that fall within the spirit and broad scope of the appended claims.

The invention claimed is:

1. A method of providing welding type power for a single welding operation, comprising:
    (a) providing a first welding process having a first welding process power;
    (b) then ending the providing of the first welding process providing a second welding process having a second welding process power, wherein the second welding process is a hotter welding process than the first welding process and the first welding process is a cooler welding process than the second welding process;
    (c) then ending the providing of the second process welding power; and
    (d) repeating (a)-(c) a plurality of times in a single welding operation wherein a welding system provides the first welding process and the second welding process; and
    (e) receiving a signal from outside of the welding system and wherein ending the providing of the first welding process and ending the providing of the second welding process are done in response to the receiving of the signal from outside of the welding system.

2. A method of providing welding type power for a single welding operation, comprising:
    (a) providing a first welding process having a first welding process power;
    (b) then, in response providing the first welding process for a first length of time, ending the providing of the first welding process and providing at least a third welding process having a third welding process power after ending the providing of the first welding process, and ending the providing of the at least a third welding process after providing the at least a third welding process and providing a second welding process having a second welding process power, wherein the second welding process is a hotter welding process than the first welding process and the first welding process is a cooler welding process than the second welding process;

(c) then, in response to providing the second welding process for a second length of time, ending the providing of the second process welding power; and (d) repeating (a)-(c) a plurality of times in a single welding operation.

* * * * *